US011789992B2

(12) United States Patent
Calhoun

(10) Patent No.: US 11,789,992 B2
(45) Date of Patent: *Oct. 17, 2023

(54) SEARCH-BASED NAVIGATION OF MEDIA CONTENT

(71) Applicant: TIVO CORPORATION, San Jose, CA (US)

(72) Inventor: Curtis Calhoun, El Sobrante, CA (US)

(73) Assignee: TIVO CORPORATION, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/841,135

(22) Filed: Apr. 6, 2020

(65) Prior Publication Data
US 2020/0233892 A1 Jul. 23, 2020

Related U.S. Application Data

(63) Continuation of application No. 15/688,415, filed on Aug. 28, 2017, now Pat. No. 10,628,477, which is a continuation of application No. 13/457,608, filed on Apr. 27, 2012, now Pat. No. 9,785,639.

(51) Int. Cl.
G06F 16/43 (2019.01)
(52) U.S. Cl.
CPC .................... G06F 16/43 (2019.01)
(58) Field of Classification Search
CPC ............ G06F 17/30864; G06F 17/30; G06F 17/30817; G06F 17/3082; G06F 16/951; G06Q 30/00; G10L 15/04
See application file for complete search history.

(56) References Cited

U.S. PATENT DOCUMENTS

| 8,898,153 | B1* | 11/2014 | Kim ...................... G06F 16/951 707/723 |
| 9,785,639 | B2 | 10/2017 | Calhoun |
| 10,628,477 | B2 | 4/2020 | Calhoun |
| 2002/0054083 | A1* | 5/2002 | Boreczky ............ G06F 16/7834 715/738 |
| 2004/0125877 | A1 | 7/2004 | Chang et al. |
| 2006/0075420 | A1* | 4/2006 | Ludvig .................. H04H 60/32 725/9 |
| 2007/0106646 | A1 | 5/2007 | Stern et al. |
| 2007/0239713 | A1* | 10/2007 | Leblang ................ G06F 16/951 |
| 2007/0255565 | A1* | 11/2007 | Yu ....................... G06F 16/7844 704/251 |

(Continued)

OTHER PUBLICATIONS

No. U.S. Appl. No. 15/688,415, USPTO e-Office Action: EXIN— Examiner Interview Summary Record (PTOL-413), dated Oct. 4, 2019, 2pages.

(Continued)

Primary Examiner — Sang H Kim
(74) Attorney, Agent, or Firm — HALEY GUILIANO LLP

(57) ABSTRACT

Mechanisms are provided to allow for improved media content navigation. Metadata such as closed captioning, social media content, and tags associated with various media segments are analyzed to allow identification of particular entities depicted in the various media segments. Image recognition and audio recognition algorithms can also be performed to further identify entities or validate results from the analysis of metadata.

20 Claims, 6 Drawing Sheets

(56) References Cited

U.S. PATENT DOCUMENTS

| | | | | |
|---|---|---|---|---|
| 2008/0155623 | A1* | 6/2008 | Ota | H04N 7/173 348/E7.069 |
| 2008/0270344 | A1* | 10/2008 | Yurick | G06F 16/4393 |
| 2009/0019009 | A1* | 1/2009 | Byers | G06F 16/738 |
| 2009/0094113 | A1 | 4/2009 | Berry et al. | |
| 2009/0178001 | A1* | 7/2009 | Verheyden | G11B 27/105 715/810 |
| 2009/0276402 | A1* | 11/2009 | Stiers | H04N 5/76 |
| 2009/0313227 | A1* | 12/2009 | Dunning | G06F 16/436 |
| 2010/0070523 | A1* | 3/2010 | Delgo | G11B 27/34 707/769 |
| 2010/0082585 | A1 | 4/2010 | Barsook et al. | |
| 2010/0199295 | A1* | 8/2010 | Katpelly | G06F 16/686 725/46 |
| 2011/0010372 | A1* | 1/2011 | Sahasrabudhe | G06Q 40/06 707/E17.059 |
| 2011/0035406 | A1 | 2/2011 | Petrou et al. | |
| 2011/0099195 | A1* | 4/2011 | Patwardhan | G06F 16/738 707/769 |
| 2011/0225608 | A1* | 9/2011 | Lopatecki | G06F 16/743 725/34 |
| 2012/0185482 | A1* | 7/2012 | Sedam | H04W 4/00 707/738 |
| 2012/0323897 | A1* | 12/2012 | Daher | G06F 16/433 707/723 |
| 2013/0166587 | A1* | 6/2013 | Berry | G06F 16/489 707/769 |
| 2013/0290846 | A1 | 10/2013 | Calhoun | |
| 2017/0371871 | A1 | 12/2017 | Calhoun | |

OTHER PUBLICATIONS

U.S. Appl. No. 15/688,415, Notice Of Allowance And Fees Due (Ptol-85), dated Dec. 16, 2019, 13 pgs.

U.S. Appl. No. 13/457,068, Non Final Office Action dated Jan. 2, 2014, 12pgs.

U.S. Appl. No. 13/457,608, Advisory Action dated Jan. 29, 2016, 4pgs.

U.S. Appl. No. 13/457,608, Advisory Action dated Nov. 7, 2014, 3pgs.

U.S. Appl. No. 13/457,608, Advisory Action dated Dec. 11, 2015, 3pgs.

U.S. Appl. No. 13/457,608, Advisory Action dated Dec. 22, 2016, 6pgs.

U.S. Appl. No. 13/457,608, Examiner Interview Summary dated Jan. 29, 2016, 1pg.

U.S. Appl. No. 13/457,608, Examiner Interview Summary dated Feb. 12, 2016, 3pgs.

U.S. Appl. No. 13/457,608, Examiner Interview Summary dated Jun. 30, 2014, 3pgs.

U.S. Appl. No. 13/457,608, Examiner Interview Summary dated Aug. 5, 2015, 3pgs.

U.S. Appl. No. 13/457,608, Examiner Interview Summary dated Aug. 16, 2016, 3pgs.

U.S. Appl. No. 13/457,608, Examiner Interview Summary dated Nov. 18, 2014, 3pgs.

U.S. Appl. No. 13/457,608, Examiner Interview Summary dated Dec. 10, 2015, 3pgs.

U.S. Appl. No. 13/457,608, Examiner Interview Summary dated Dec. 22, 2016, 2pgs.

U.S. Appl. No. 13/457,608, Final Office Action dated Aug. 27, 2014, 13pgs.

U.S. Appl. No. 13/457,608, Final Office Action dated Sep. 29, 2016, 18pgs.

U.S. Appl. No. 13/457,608, Final Office Action dated Sep. 30, 2015, 15pgs.

U.S. Appl. No. 13/457,608, Non Final Office Action dated May 4, 2016, 15pgs.

U.S. Appl. No. 13/457,608, Non Final Office Action dated May 8, 2015, 15pgs.

U.S. Appl. No. 13/457,608, Notice of Allowance dated Apr. 27, 2017, 15pgs.

U.S. Appl. No. 15/688,415, Non Final Office Action dated Jul. 11, 2019, 22pgs.

Google Search "scan media segments using image recognition of video and analyze" (http://www.google.com/search?safe=off&hl=en&tbm=pts&q=scan=media=segments=usi . . . ), Apr. 27, 2015, 1 pg.

* cited by examiner

SEARCH-BASED NAVIGATION OF MEDIA CONTENT

CROSS-REFERENCE TO RELATED APPLICATIONS

This application is a continuation of U.S. patent application Ser. No. 15/688,415, filed on Aug. 28, 2017 and to be issued on Apr. 21, 2020 as U.S. Pat. No. 10,628,477, which is a continuation of U.S. patent application Ser. No. 13/457,608, filed on Apr. 27, 2012 and issued on Oct. 10, 2017 as U.S. Pat. No. 9,785,639, which are hereby incorporated by reference in their entirety and for all purposes.

TECHNICAL FIELD

The present disclosure relates to search-based navigation of media content such as live and on-demand content streams.

DESCRIPTION OF RELATED ART

A variety of conventional mechanisms allow for navigation of media content. In some examples, media content may be divided into chapters, with thumbnail images providing information about scenes included in each chapter. Viewers can also fast forward and/or rewind through media content such as video clips and live streams. However, fast forward and/or rewind through media content can be highly inefficient. In some instances, skip forward and skip backward capabilities allow navigation through the media content using predefined increments of time. However, these mechanisms can similarly be inefficient and imprecise.

Other pieces of media content include bookmarks provided by a content provider to allow for more efficient navigation. These bookmarks may be preset or supplemented with user bookmarks. However, all of these mechanisms have significant drawbacks. Consequently, techniques and mechanisms are provided to improve media content navigation using search.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
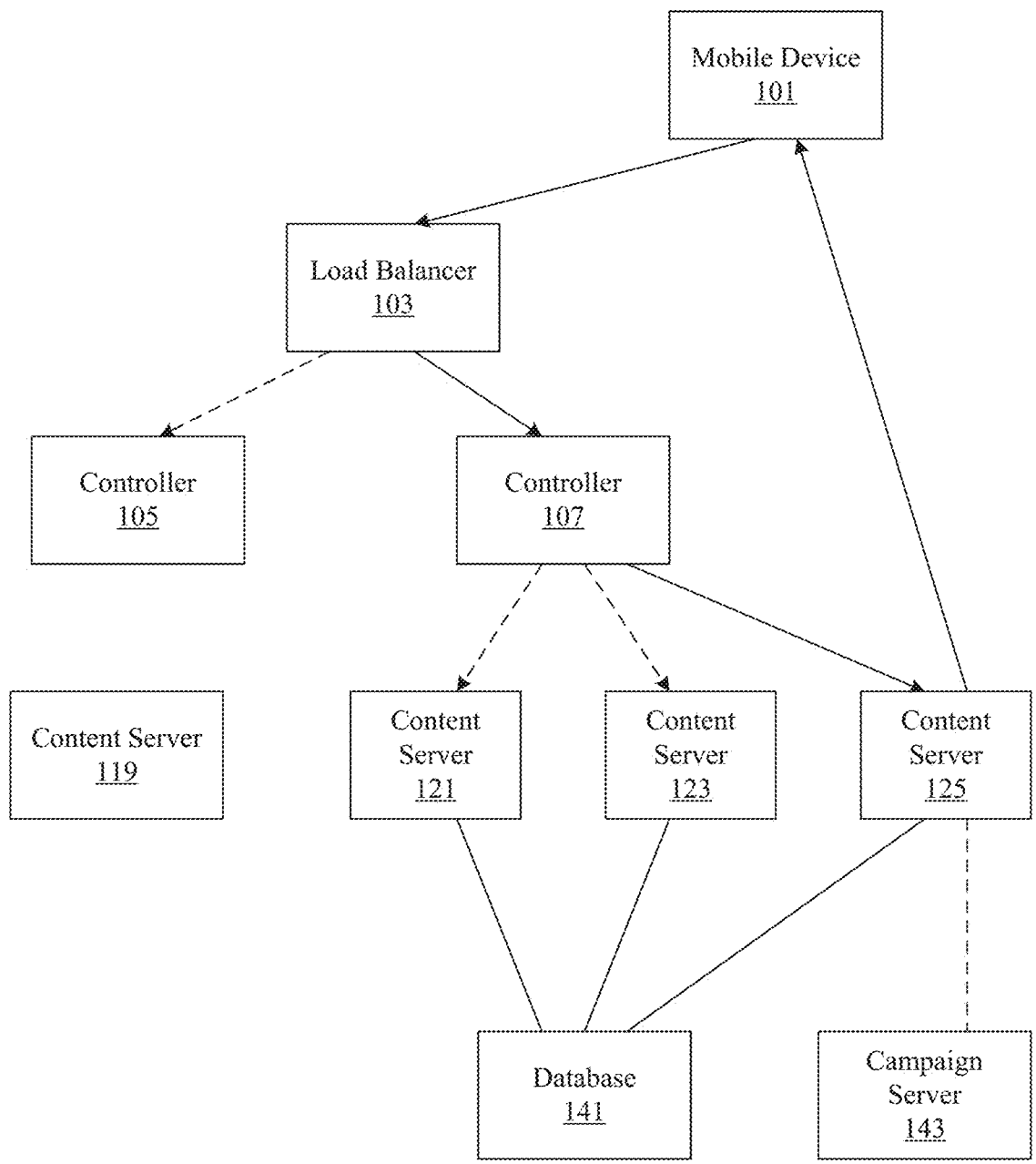
FIG. 1 illustrates one example of a system that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular operations and types of content. However, it should be noted that the techniques of the present invention apply to a variety of operations and types of content. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to allow for improved media content navigation. Metadata such as closed captioning, social media content, and tags associated with various media segments are analyzed to allow identification of particular entities depicted in the various media segments. Image recognition and audio recognition algorithms can also be performed to further identify entities or validate results from the analysis of metadata.

Example Embodiments

Conventional media search and discovery mechanisms are limited. A user conventionally has to fast forward and/or rewind through media content such as video clips and live streams. In some instances, the user can access skip forward or skip backward operations. Media content providers sometimes include tags or chapter titles and delineations to allow more efficient navigation. Title and content description information may also highlight particular time markers that may be associated with a particular entity.

Information is typically provided at the channel, show, and episode level with title, content description, and possibly show snapshots presented to a user often in grid-type formats. A user navigates to a particular channel, show, and episode and selects the episode to begin playback of that episode. In some instances, video clips are provided with show snapshots, title, and content description and playback begins with selection of the title or snapshot.

However, conventional mechanisms for content discovery are usually limited to the content listing level. For example, if a viewer wants to find video clips depicting squirrels, the viewer may navigate to time slots and select particular episodes of nature-related programs. The episodes may or may not feature squirrels. The user would then have to browse through a selection of show titles, if available, to guess which shows might feature squirrels. In some instances, there may be websites that feature squirrels and fans may have indicated where media segments depicting squirrels can be located. However, out-of-band search still does not allow easy access to shows, clips, segments, or snapshots in shows featuring squirrels.

Consequently, the techniques and mechanisms of the present invention analyze media content metadata such as closed captions to allow for text-based search of media content. According to various embodiments, users enter search terms and metadata such as closed captions are analyzed to display media segment results. Media segments may be portions of a program that are relevant to the search terms. In particular embodiments, search results are displayed as tags on a seekbar, or as a time-based list of thumbnails, giving the user powerful media content navigation capabilities.

According to various embodiments, image recognition and audio recognition algorithms can be used in lieu of or to augment metadata search results. In some instances, video can be analyzed manually to identify entities such as characters, objects, emotions, types of scenes, etc.

For example, metadata may indicate that squirrels are depicted at time positions 4:27-5:10 and 18:10-19:25. However, image recognition and audio recognition algorithms may indicate that squirrels are only portrayed at in media segment 4:27-5:10. Image recognition and audio recognition algorithms can be used to validate metadata search results. In some examples, only media segments that pass metadata search and image/audio recognition algorithms thresholds are presented to the viewer.

According to various embodiments, a viewer may wish to find segments featuring mountain climbing. There may be some media content explicitly featuring mountain climbing in the title or content description. However, there may be numerous other segments featuring mountain climbing that may not readily be identifiable. Consequently, when a user enters the terms mountain climbing in a search box, the techniques and mechanisms of the present invention provide programs, movies, shows, clips, advertisements, and media segments that depict mountain climbing. Media segments may be mere 5 second segments or run far longer. Multiple media segments may be identified using snapshots on a timeline, displayed as thumbnails in grid, depicted in short segment sequences on a mosaic, provided in a list, etc. Analysis of metadata along with video and audio recognition of entities in media content allow for robust media content search and navigation capabilities.

FIG. 1 is a diagrammatic representation illustrating one example of a system that can use the techniques and mechanisms of the present invention. According to various embodiments, content servers 119, 121, 123, and 125 are configured to provide media content to a mobile device 101. In some examples, media content may be provided using protocols such as HTTP, RTP, and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content to mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 can also receive media streams from content providers such as satellite providers or cable providers and send the streams to devices. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101. In particular examples, the content server 125 obtains profile information from campaign server 143.

In some examples, the content server 125 can also obtain profile information from other sources, such as from the mobile device 101 itself. Using the profile information, the content server 125 can select a clip from a database 141 to provide to a user. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected using profile information from a campaign server 143 and used to seamlessly replace default advertisements in a live stream. Content servers 119, 121, 123, and 125 have the capability to manipulate packets to allow introduction and removal of media content, tracks, metadata, etc.

Figure 2A:
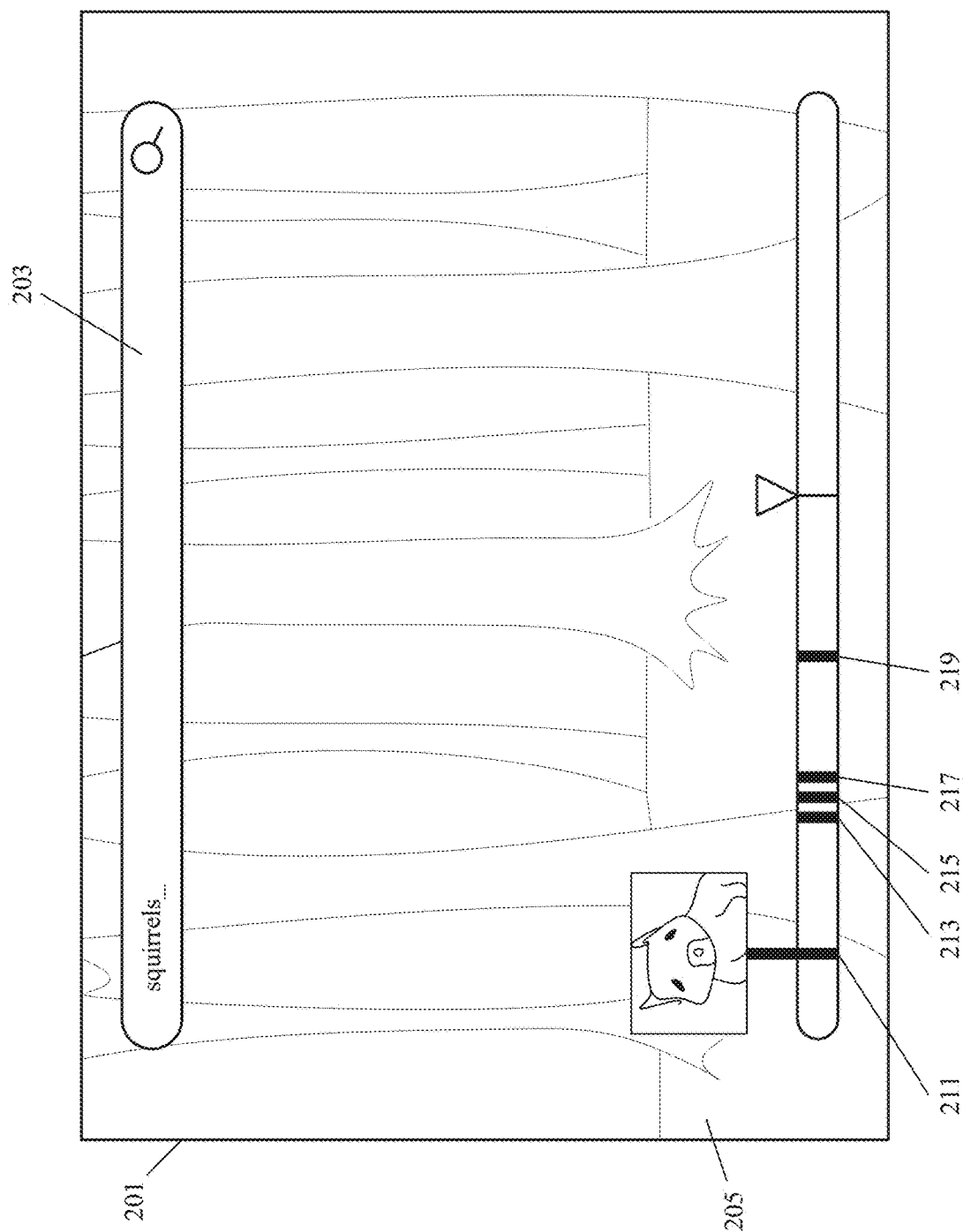
FIGS. 2A and 2B illustrate examples of media search and discovery screens.

FIG. 2A illustrates one example of a media content search and discovery screen showing results in a seekbar. According to various embodiments, the search and discovery screen 201 includes a search box 203. Media content is depicted in frame 205. According to various embodiments, a user entering a search term such as squirrels into a search box 203 triggers display of markers 211, 213, 215, 217, and 219 on a seekbar. The markers identify locations in a piece of media content where squirrels may have been identified either manually, through image and audio recognition algorithms, and/or through analysis of metadata such as closed captions, social network comments, and chat data. A user or viewer can scroll to a particular location on the seekbar to verify whether media content at that location or time position does include material relevant to the search term.

According to various embodiments, the search for the term squirrels triggers immediate or delayed playback of media content.

Figure 2B:
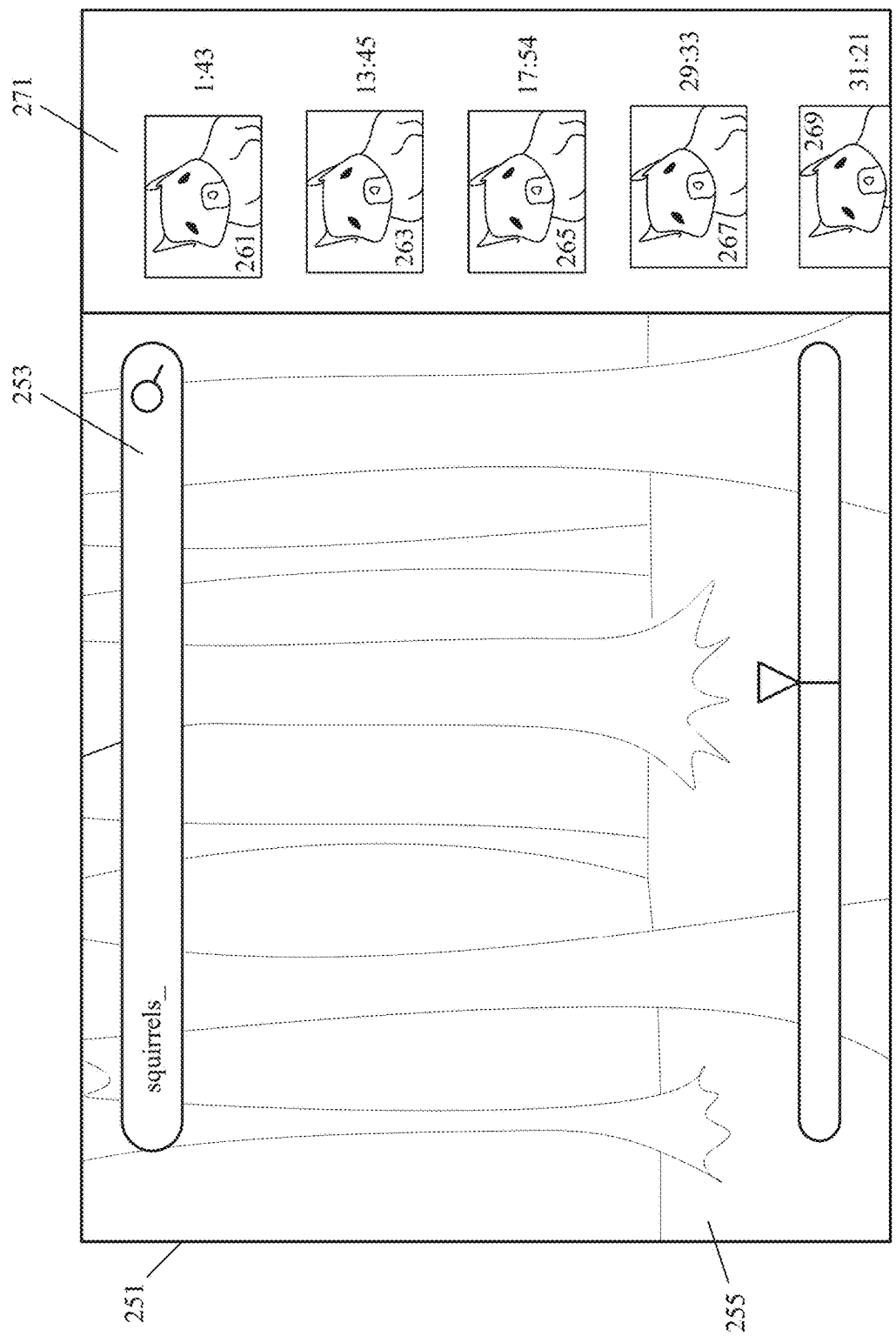

FIG. 2B illustrates one example of a media content search and discovery screen showing thumbnail images corresponding to locations where media content relevant to a search term can be found. According to various embodiments, the search and discovery screen 251 includes a search box 253. Media content is depicted in frame 255. According to various embodiments, a user entering a search term such as squirrels into a search box 253 triggers display of thumbnails 261, 263, 265, 267, and 269 in a sidebar 271. The images identify locations or time positions in media content that depict material relevant to the search term. The thumbnail image locations may have been identified either manually, through image and audio recognition algorithms, and/or through analysis of metadata such as closed captions, social network comments, and chat data. A user or viewer can view the thumbnail and/or the content corresponding to the thumbnail to verify whether media content at that location or time position does include material relevant to the search term.

According to various embodiments, the thumbnails may correspond to time positions in different pieces of media content such as different shows, movies, video clips, programs, etc. The sidebar may depict squirrels in a variety of different programs and different time positions in the different programs.

Figure 3:
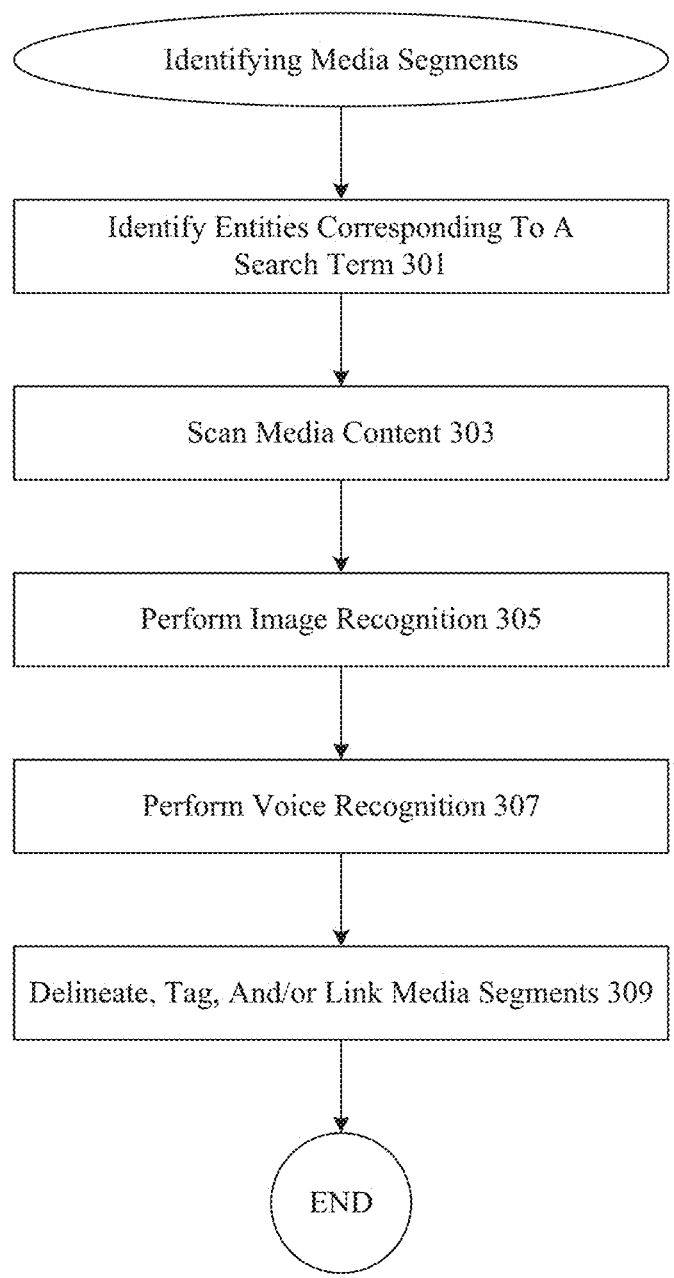
FIG. 3 illustrates one example of a technique for generating information for media discovery.

FIG. 3 illustrates one example of a technique for identifying media segments. According to various embodiments, a media content search and discovery system identifies entities corresponding to a search term at 301. The entities may be characters, objects, places, things, as well as types of scenes such as action sequences, romantic scenes, etc. According to various embodiments, media content from a source such as a media content library is scanned at 303. The scan may be performed by analyzing metadata such as closed captioning, social network commentary, and chat data. The media content may also be scanned manually or by using image recognition and voice recognition algorithms to identify particular entities. In some examples, image recognition is performed at 305 and voice recognition is performed at 307 to identify entities.

According to various embodiments, media segments are delineated, tagged, and/or linked at 309. In some instances, media segments may be delineated by specifying start points and end points. In other examples, only start points are identified. Tags or markers may include character names, entity names, and likelihood of relevance. In some instances, segments may have tags associated with multiple entities. In some examples, media segments are ordered based on relevance. A search for a particular entity may begin playback of a media segment having the highest relevance with that entity.

Figure 4:
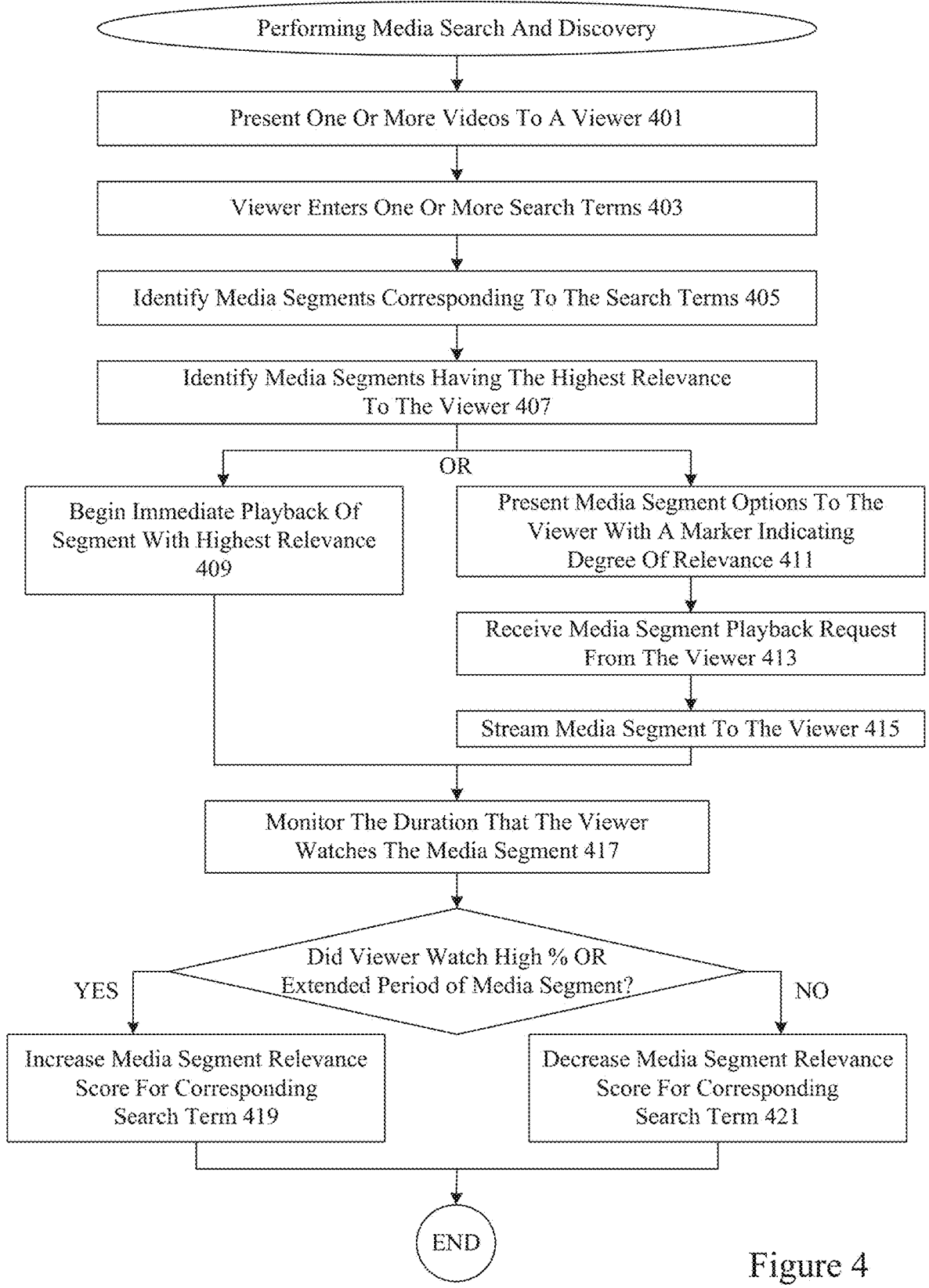
FIG. 4 illustrates one example of a technique for performing media content discovery.

FIG. 4 illustrates a particular example of a technique for performing media search and discovery. According to various embodiments, one or more videos may be presented to a viewer at 401. In particular embodiments, a viewer enters one or more search terms at 403. At 405, media segments corresponding to the search terms are identified. The media segments may be identified with markers indicating time positions with media content corresponding to the search term. At 407, media segments having the highest relevance are identified for the viewer. In some examples, playback of the segment with the highest relevance begins immediately at 409. In other examples, media segment options are presented to the viewer with a marker indicating the degree of relevance at 411.

According to various embodiments, a media segment playback request is received from the viewer at 413 and the media segment is streamed to the viewer at 415. According to various embodiments, the duration the viewer watches the media segment is monitored to determine how relevant the media segment was to the user at 417. If the viewer watches a high percentage of the media segment or watches for an extended period of time, the media segment relevance score for the corresponding search term is increased at 419. If the viewer watches a low percentage of the media segment or watches for a limited period of time, the media segment relevance score may be decreased at 421.

Figure 5:
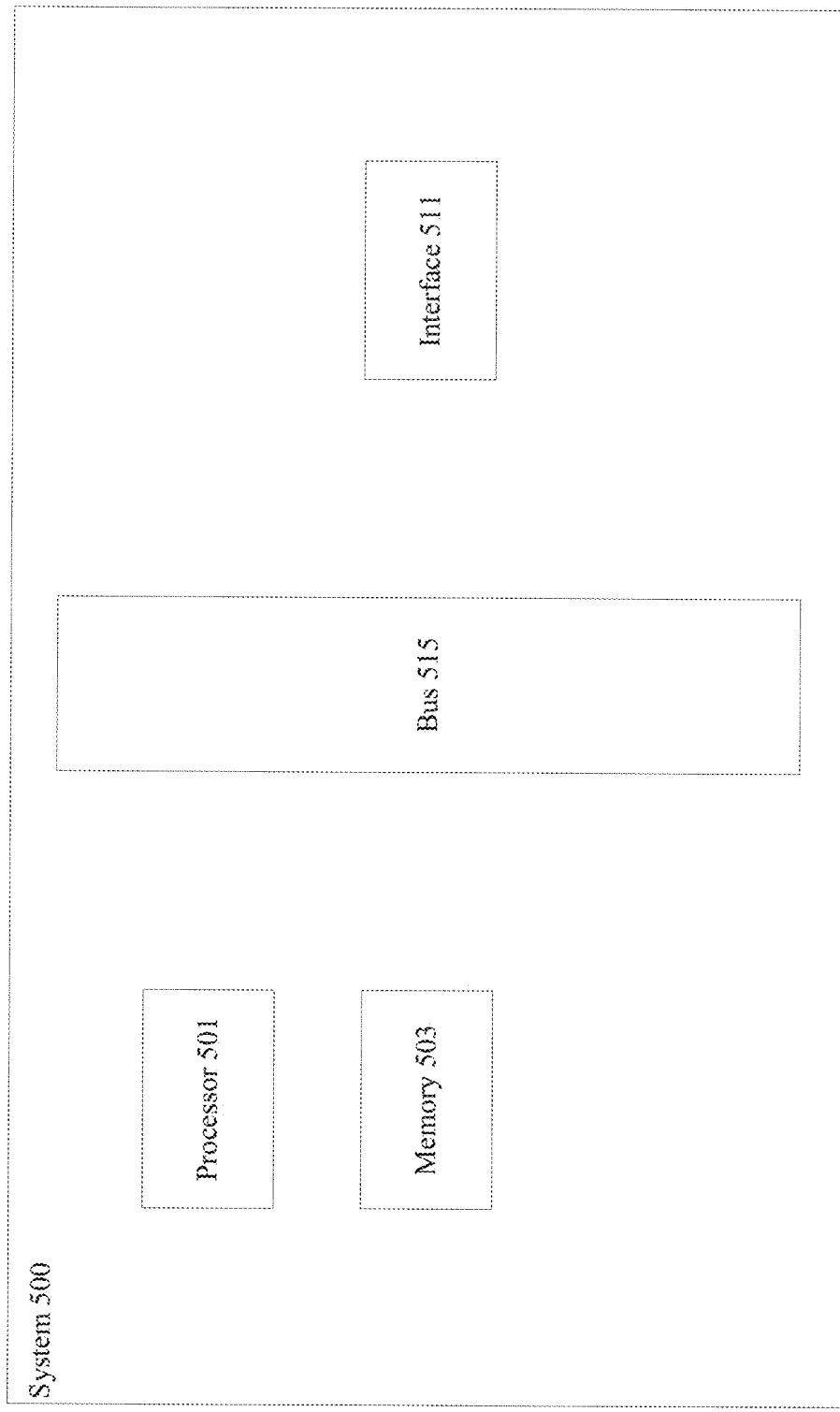
FIG. 5 illustrates one example of a computer system.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting media content to a client. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a content server that also includes a transceiver, streaming buffers, and a program guide database. The content server may also be associated with subscription management, logging and report generation, and monitoring capabilities. In particular embodiments, the content server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the content server handles requests and responses for media content-related transactions while a separate streaming server provides the actual media streams.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
  receiving, from a user, a search term for media content;
  identifying a plurality of entities associated with the search term;
  identifying a plurality of media segments corresponding to the plurality of entities after receiving the search term from the user, the plurality of media segments including a video result comprising a video track, an audio track, a metadata track, and a relevance score comprising a value indicating a degree of relevance of the media segment to the search term;
  comparing the relevance score of each of the plurality of media segments to a threshold relevance score;
  determining a subset of the plurality of media segments, wherein each of the media segments within the subset has a relevance score higher than the threshold relevance score,
  displaying the subset of the plurality of media segments, wherein the subset is displayed as one or more time-based thumbnails and content corresponding to the thumbnails, the one or more time-based thumbnails comprising identifiers for each of the media segments within the subset;
  skipping playback of a portion of the plurality of media segments until a first media segment within the subset of the plurality of media segments is reached;
  playing the first media segment;
  tracking playback of the first media segment by tracking a percentage of the first media segment viewed by the user;
  determining, while the user views the first media segment, that the percentage of the first media segment viewed by the user has exceeded a first threshold percentage, the first threshold percentage comprising a stored percentage value; and
  increasing the relevance score of the first media segment, while the user views the first media segment, to indicate increased relevance of the first media segment to the search term based on the determining that the percentage of the first media segment viewed by the user has exceeded the first threshold percentage.

2. The method of claim 1, wherein the media content comprises a video stream.

3. The method of claim 1, wherein the media content comprises a video clip.

4. The method of claim 1, wherein the identifiers are markers associated with start time position information for each of the plurality of media segments.

5. The method of claim 1, further comprising:
  scanning the plurality of media segments, wherein scanning the plurality of media segments includes analyzing metadata included in the metadata track, wherein analyzing metadata includes analyzing closed captions, chat data, and social media;
  tagging the plurality of media segments with a plurality of identifiers, each of the identifiers indicating time positions of media content associated with the search term; and
  validating the tagged media segments to verify that the tagged media segments include the plurality of entities associated with the search term.

6. The method of claim 1, wherein the plurality of entities comprise characters, objects, places, action sequences, and romantic scenes.

7. The method of claim 1, wherein the plurality of media segments are a plurality of portions of a video program or movie.

8. A system comprising:
  an interface operable to receive from a user a search term for media;
  a processor operable to identify a plurality of entities corresponding to the search term, wherein the plurality of entities can include characters, objects, places, action sequences, and
  romantic scenes;
  wherein the processor is further operable to:
    receive, from the interface, a search term for media content;
    identify a plurality of entities associated with the search term;
    identify a plurality of media segments corresponding to the plurality of entities after receiving the search term from the user, the plurality of media segments including a video result comprising a video track, an audio track, a metadata track, and a relevance score comprising a value indicating a degree of relevance of the media segment to the search term;
    compare the relevance score of each of the plurality of media segments to a threshold relevance score;
    determine a subset of the plurality of media segments, wherein each of the media segments within the subset has a relevance score higher than the threshold relevance score;
    display the subset of the plurality of media segments, wherein the subset is displayed as one or more time-based thumbnails and content corresponding to the thumbnails, the one or more time-based thumbnails comprising identifiers for each of the media segments within the subset;
    skip playback of a portion of the plurality of media segments until a first media segment within the subset of the plurality of media segments is reached;
    play the first media segment;
    track playback of the first media segment by tracking a percentage of the first media segment viewed by the user;
    determine, while the user views the first media segment, that the percentage of the first media segment viewed by the user has remained below a first threshold percentage, the first threshold percentage comprising a stored percentage value; and
    decrease the relevance score of the first media segment, while the user views the first media segment, to indicate decreased relevance of the first media segment to the search term based on the determining that the percentage of the first media segment viewed by the user has remained below the stored percentage value of the first threshold percentage; and
  a display operable to show only the subset of the identified plurality of media segments, wherein the display is operable to display the subset as one or more time-based thumbnails and content corresponding to the thumbnails, the one or more time-based thumbnails comprising identifiers for each of the media segments within the subset.

9. The system of claim 8, wherein the media content comprises a video stream.

10. The system of claim 8, wherein the media content comprises a video clip.

11. The system of claim 8, wherein the identifiers are markers associated with start time position information for each of the plurality of media segments.

12. The system of claim 8, wherein the processor is further operable to:
   scan the plurality of media segments, wherein scanning the plurality of media segments includes analyzing metadata included in the metadata track, wherein analyzing metadata includes analyzing closed captions, chat data, and social media;
   tag the plurality of media segments with a plurality of identifiers, each of the identifiers indicating time positions of media content associated with the search term; and
   validate the tagged media segments to verify that the tagged media segments include the plurality of entities associated with the search term.

13. The system of claim 8, wherein the subset of the plurality of media segments is displayed in an order based on their relevance scores.

14. The system of claim 8, wherein the plurality of media segments are a plurality of portions of a video program or movie.

15. A non-transitory computer readable medium comprising instructions for:
   receiving, from a user, a search term for media content;
   identifying a plurality of entities associated with the search term;
   identifying a plurality of media segments corresponding to the plurality of entities after receiving the search term from the user, the plurality of media segments including a video result comprising a video track, an audio track, a metadata track, and a relevance score comprising a value indicating a degree of relevance of the media segment to the search term;
   comparing the relevance score of each of the plurality of media segments to a threshold relevance score;
   determining a subset of the plurality of media segments, wherein each of the media segments within the subset has a relevance score higher than the threshold relevance score;
   displaying the subset of the plurality of media segments, wherein the subset is displayed as one or more time-based thumbnails and content corresponding to the thumbnails, the one or more time-based thumbnails comprising identifiers for each of the media segments within the subset;
   skipping playback of a portion of the plurality of media segments until a first media segment within the subset of the plurality of media segments is reached;
   playing the first media segment;
   tracking playback of the first media segment by tracking a percentage of the first media segment viewed by the user;
   determining, while the user views the first media segment, that the percentage of the first media segment viewed by the user has exceeded a first threshold percentage, the first threshold percentage comprising a stored percentage value; and
   increasing the relevance score of the first media segment, while the user views the first media segment, to indicate increased relevance of the first media segment to the search term based on the determining that the percentage of the first media segment viewed by the user has exceeded the stored percentage value of the first threshold percentage.

16. The non-transitory computer readable medium of claim 15, wherein the media content comprises a video stream.

17. The non-transitory computer readable medium of claim 15, wherein the media content comprises a video clip.

18. The non-transitory computer readable medium of claim 15, wherein the identifiers are markers associated with start time position information for each of the plurality of media segments.

19. The non-transitory computer readable medium of claim 15, further comprising instructions for:
   scanning the plurality of media segments, wherein scanning the plurality of media segments includes analyzing metadata included in the metadata track, wherein analyzing metadata includes analyzing closed captions, chat data, and social media;
   tagging the plurality of media segments with a plurality of identifiers, each of the identifiers indicating time positions of media content associated with the search term; and
   validating the tagged media segments to verify that the tagged media segments include the plurality of entities associated with the search term.

20. The non-transitory computer readable medium of claim 15, wherein the plurality of entities comprise characters, objects, places, action sequences, and romantic scenes.

* * * * *